United States Patent Office 3,001,988
Patented Sept. 26, 1961

3,001,988
3-OXYGENATED 17β-AMINOALKANAMIDOAN-
DROST-4/5-ENES, 5α-ANDROSTANES CORRE-
SPONDING, AND INTERMEDIATES THERETO
Leonard N. Nysted, Highland Park, Ill., assignor to G. D.
Searle & Co., Chicago, Ill., a corporation of Delaware
No Drawing. Filed July 19, 1960, Ser. No. 43,727
8 Claims. (Cl. 260—239.55)

This invention relates to 3-oxygenated 17-aminoalkan-amidoandrostenes, androstanes identical therewith except for the indicated hydrogen, intermediates to these androstenes and androstanes, and processes whereby the described compounds can be manufactured. More particularly, this invention relates to compounds of the formula

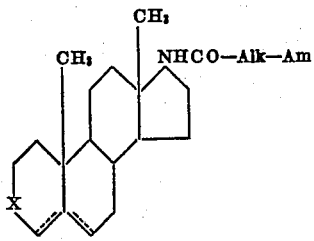

wherein the dotted line represents an optional double bond in the 4(5) or 5(6) position; Alk represents an alkylene radical; Am represents an amino radical; and X represents a carbonyl, hydroxymethylene, or alkanoyloxymethylene radical or a radical of the formula

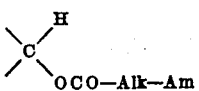

in which Alk and Am are defined as before. The 17-aminoalkanamido side-chain is preferably, though not necessarily exclusively, present in the β configuration relative to the steroid nucleus; and the 3-oxy substitutent is likewise disposed. When there is no endocyclic double bond, the 5-hydrogen is most desirably α.

Among the alkylene radicals represented by Alk, especially lower alkylene radicals are preferred, which is to say methylene, ethylene, trimethylene, propylene, and like bivalent saturated acylic straight- or branched-chain hydrocarbon groupings.

Am in the foregoing formulas subsumes both the amino radical, —NH₂, and the amino radical as modified by introduction of one or two alkyl radicals—especially lower alkyl radicals, for example, methyl, ethyl, propyl, butyl, isobutyl, sec-butyl, tert-butyl, pentyl, isopentyl, tert-pentyl, neopentyl, hexyl, isohexyl, heptyl, octyl, etc. The alkyl groupings present may either be discrete, as when Am designates a radical of the formula

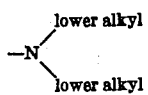

or they may be joined together directly or through oxygen or a second nitrogen atom to compose cyclic amino radicals. Illustrative of the cyclic amino radicals contemplated by Am are pyrrolidino, 2-methylpyrrolidino, 2,5-dimethylpyrrolidino, 3-methyl-4-ethylpyrrolidino, piperidino, 3-methylpiperidino, 2,6-dimethylpiperidino, morpholino, piperazino, 4-methylpiperazino, and like monovalent 5- and 6-membered heterocyclic groupings. Alternatively, one or more phenyl substitutents may be present on the heterocyclic ring, for example, as in 2-phenylpiperidino, 3-phenylmorpholino, 2-phenyl-3-methylmorpholino, and 2,3-diphenylpiperazino groupings.

The alkanoyloxy radicals represented by X in the compound formula are optimally lower alkanoyloxymethylene radicals, whence those skilled in the art will understand radicals of the formula

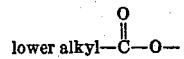

Equivalent to the foregoing basic amines of this invention for the purposes hereinbelow described are non-toxic acid addition salts thereof having the formula

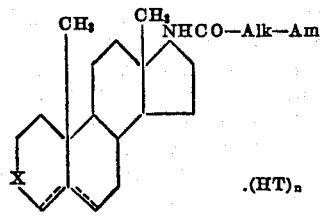

wherein the dotted line, Alk, Am, and X have the same meanings signed above; T represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and n is a positive integer amounting to less than 5.

The compounds to which this invention relates are useful because of their valuable pharmacological properties. In particular, they unexpectedly share a capacity to dull the appetite, in addition to which they are eurhythmic and anti-cholesterologenic agents, central nervous system stimulants, and adapted to inhibit the heat, swelling, rubor, and granuloma-formation characteristic of the inflammatory response to tissue injury. Obviously, the intermediates whereby the foregoing compounds are manufactured are also useful.

Manufacture of the instant products proceeds from an appropriate 17-chloroalkanamido intermediate of the formula

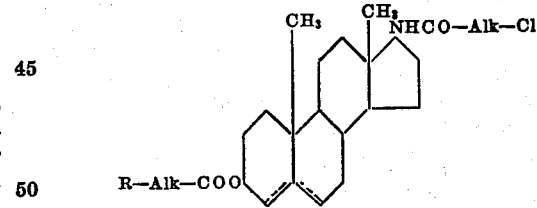

wherein Alk and the dotted line have the same significance as before and R represents hydrogen or chlorine, the intermediate being obtained from the corresponding 17-amino-3-hydroxy/lower alkanoyloxy steroid by heating it with an appropriate chloroalkanoyl anhydride or chloride in solvent medium. The 17-chloroalkanamido intermediate, upon heating with a selected amine

Am—H usually but not unexceptionably in solvent medium, affords the 17-aminoalkanamido 3-ester hereof

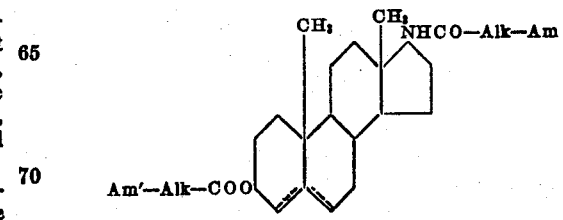

wherein Am' represents hydrogen or is identical with Am, depending upon whether the precursor is a 3-alkanoate or a 3-chloroalkanoate, respectively. The 3-ester group is cleaved by heating in the presence of methanolic alkali to give the 3-ol, which in turn is oxidized to the 3-one via either the Oppenauer procedure or brief contact with chromium trioxide and sulfuric acid in acetic acid medium. The Oppenauer procedure is preferred when an endocyclic double bond is present, whereas chromium trioxide is the oxidant of choice when the 3-ol to be oxidized is an androstane. Alternatively, the 3-ol is re-esterified if and as desired with an alkanoic acid and anhydrous hydrogen chloride. Incorporation of potassium carbonate and aqueous alcohol into the previously described reaction between the 17-chloroalkanamido intermediate and a selected amine affords the corresponding 17-aminoalkanamido 3-ol directly.

Conversion of the free bases of this invention to corresponding acid addition salts is accomplished by simple admixture thereof with any of various inorganic and strong organic acids, the anionic portion of which conforms to T as hereinbefore defined.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 3β-chloroacetoxy-17β-chloroacetylamino-androst-5-ene

A solution of 15 parts of 17β-aminoandrost-5-ene-3β-ol and 45 parts of chloroacetic anhydride in 270 parts of benzene is let stand at room temperatures for 24 hours, whereupon solvent is removed by vacuum distillation. The residue is triturated with 140 parts of ether, affording a crystalline precipitate which is filtered off and further purified by recrystallization from a mixture of dichloromethane and acetone. The product thus obtained is 3β-chloroacetoxy - 17β-chloroacetylaminoandrost - 5-ene, the melting point of which is 232–235°.

(B) 3β-diethylaminoacetoxy-17β-diethylamino-acetylaminoandrost-5-ene

A mixture of 4 parts of 3β-acetoxy-17β-chloroacetyl-aminoandrost-5-ene, 42 parts of diethylamine, and 88 parts of benzene is maintained in a sealed vessel at 65° for 24 hours, whereupon benzene and excess diethylamine are removed by vacuum distillation. The residue is extracted with ether, and the ether extract is stripped of solvent by distillation. The residue is 3β-diethylaminoacetoxy-17β-diethylaminoacetylaminoandrost-5-ene which, recrystallized from pentane, melts at 100–102°. The product has the formula

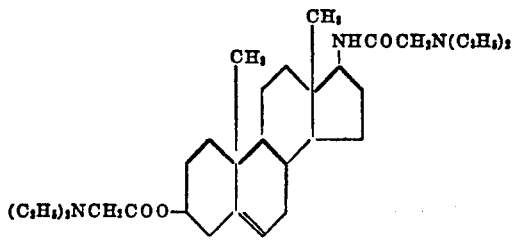

(C) 3β-diethylaminoacetoxy-17β-diethylaminoacetyl-aminoandrost-5-ene dihydrochloride A methanol solution of 3β-diethylaminoacetoxy-17β-diethylaminoacetylaminoandrost-5-ene, acidified with 2-propanolic hydrogen chloride and diluted to the point of incipient turbidity with ether, affords 3β-diethylaminoacetoxy-17β - diethylaminoacetylaminoandrost-5-ene dihydrochloride as a crystalline precipitate isolable by filtration. The product is hygroscopic and does not melt definitively.

EXAMPLE 2

17β-diethylaminoacetylaminoandrost-5-en-3β-ol

To a solution of 4 parts of 3β-diethylaminoacetoxy-17β-diethylaminoacetylaminoandrost-5-ene in 32 parts of methanol is added 2 parts of sodium hydroxide dissolved in 10 parts of water. The resultant mixture is heated for 10 minutes at 90–95°, whereupon sufficient water is introduced to bring about incipient turbidity. Upon cooling, a solid precipitate is thrown down. Filtered off and recrystallized from a mixture of acetone and hexane, this material melts at 188–191°. The product thus obtained is 17β-diethylaminoacetylaminoandrost-5-en-3β-ol, of the formula

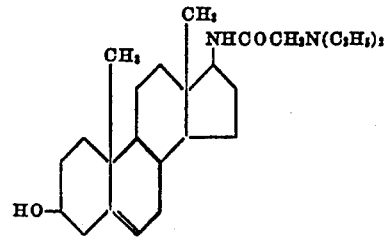

EXAMPLE 3

(A) 17β-diethylaminoacetylaminoandrost-4-en-3-one

To a solution of 9 parts of 17β-diethylaminoacetyl-aminoandrost-5-en-3β-ol and 95 parts of cyclohexanone in 450 parts of dry toluene at the boiling point under reflux is added 12 parts of aluminum isopropoxide dissolved in 90 parts of toluene. Approximately 180 parts of toluene is then distilled off during 30 minutes, whereupon heating at the boiling point under reflux is resumed for an additional 30 minutes. The resultant mixture is cooled and subsequently extracted with 400 parts of 10% hydrochloric acid, and the acid extract is washed with ether and then made basic with aqueous 40% caustic. The oil which separates is extracted with ether; and the ether extract is consecutively washed with dilute aqueous caustic and water, dried over anhydrous sodium sulfate, and stripped of solvent by distillation. The residue is 17β-diethylaminoacetylaminoandrost-4-en-3-one, of the formula

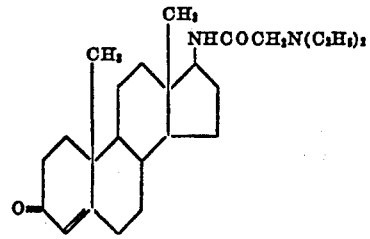

(B) 17β-diethylaminoacetylaminoandrost-4-en-3-one hydrochloride

A methanol solution of 17β-diethylaminoacetylamino-androst-4-en-3-one, made acid with hydrogen chloride dissolved in 2-propanol and thereafter diluted to the point of incipient turbidity with anhydrous ether, affords, 17β-diethylaminoacetylaminoandrost-4-en-3-one hydrochloride as a crystalline solid which melts at approximately 265°, with decomposition.

EXAMPLE 4

*(A) 3β-acetoxy-17β-chloroacetylamino-5α-androstane*

To 3 parts of chloroacetyl chloride dissolved in 45 parts of benzene is added, with agitation, 1 part of 3β-acetoxy-5α-androstan-17β-amine dissolved in 45 parts of benzene. The resultant mixture is let stand for 3 hours at room temperatures, then stripped of solvent by vacuum distillation. The residue is partitioned between water and a mixture of ether and ethyl acetate. The aqueous phase is discarded, and the ether-ethyl acetate phase is stripped of solvent by vacuum distillation. The residue is 3β-acetoxy-17β-chloroacetylamino-5α-androstane which, recrystallized from acetone, melts at 221–223°.

*(B) 3β-acetoxy-17β-diethylaminoacetylamino-5α-androstane*

A mixture of 1 part of 3β-acetoxy-17β-chloroacetylamino-5α-androstane, 14 parts of diethylamine, and 88 parts of benzene is maintained in a sealed vessel at 65° for 24 hours. Solvent and excess amine are thereupon removed by vacuum distillation, and the residue is extracted with ether. Distillation of the ether from the extract thus obtained affords 3β-acetoxy-17β-diethylaminoacetylamino-5α-androstane as the residue. The product has the formula

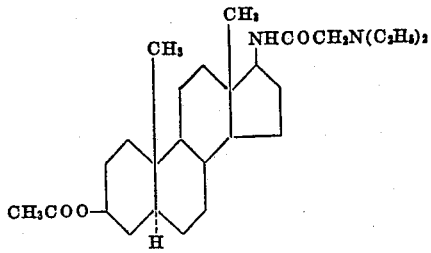

*(C) 3β-acetoxy-17β-diethylaminoacetylamino-5α-androstane hydrochloride*

From an ether solution of 3β-acetoxy-17β-diethylaminoacetylamino-5α-androstane, upon acidification with 2-propanolic hydrogen chloride and chilling, 3β-acetoxy-17β-diethylaminoacetylamino-5α-androstane hydrochloride is precipitated. The product, isolated by filtration and recrystallized from a mixture of methanol and ether, melts in the range 242–257°.

EXAMPLE 5

*17β-diethylaminoacetylamino-5α-androstan-3β-ol*

Substitution of 9 parts of 3β-acetoxy-17β-diethylaminoacetylamino-5α-androstane, 80 parts of methanol, 1 part of sodium hydroxide, and 20 parts of water for the 4 parts of 3β-diethylaminoacetoxy-17β-diethylaminoacetylaminoandrost-5-one, 32 parts of methanol, 2 parts of sodium hydroxide, and 10 parts of water, respectively, called for in Example 2 affords, by the procedure there detailed, 17β-diethylaminoacetylamino-5α-androstan-3β-ol, of the formula

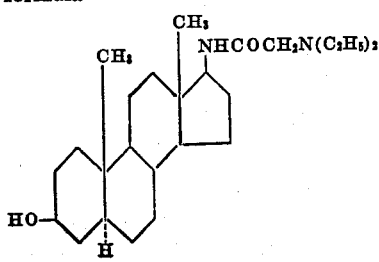

EXAMPLE 6

*17β-diethylaminoacetylamino-5α-androstan-3-one*

To a solution of 20 parts of 17β-diethylaminoacetylamino-5α-androstan-3β-ol and 10 parts of p-toluenesulfonic acid in 250 parts of acetic acid is added, with vigorous agitation during 2 minutes, 10 parts of water containing 12 parts of chromium trioxide and 12 parts of sulfuric acid. Agitation is continued for 3 minutes after the addition is complete, at which point 27 parts of 2-propanol is mixed in. Acetic acid is then removed by vacuum distillation and the residue is partitioned between aqueous 10% sodium hydroxide and ether. The ether phase is consecutively washed with water, dried over anhydrous sodium sulfate, and stripped of solvent by distillation. The residue, recrystallized from a mixture of ether and hexane, is 17β-diethylaminoacetylamino-5α-androstan-3-one, a colorless solid melting at 129–132°. The product has the formula

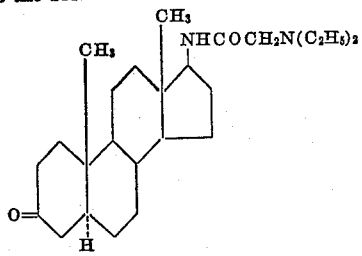

EXAMPLE 7

*(A) 17β-(3-chloropropionylamino)-3β-(3-chloropropionyloxy)androst-5-ene*

Substitution of 2 parts of 17β-aminoandrost-5-en-3β-ol and 7 parts of 3-chloropropionyl chloride for the 3β-acetoxy-5α-androstan-17β-amine and chloroacetyl chloride, respectively, called for in Example 4A affords, by the procedure there detailed, 17β-(3-chloropropionylamino)-3β-(3-chloropropionyloxy)androst-5-ene.

*(B) 17β-(3-dimethylaminopropionylamino)-3β-(3-dimethylaminopropionyloxy)androst-5-ene*

Substitution of 2 parts of 17β-(3-chloropropionylamino)-3β-(3-chloropropionyloxy)androst-5-ene and 38 parts of dimethylamine for the 3β-acetoxy-17β-chloroacetylaminoandrost-5-ene and diethylamine, respectively, called for in Example 1B affords, by the procedure there detailed, 17β-(3-dimethylaminopropionylamino)-3β-(3-dimethylaminopropionyloxy)androst-5-ene, of the formula

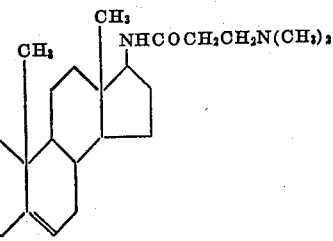

EXAMPLE 8

*3β-morpholinoacetoxy-17β-morpholinoacetylaminoandrost-5-ene*

A mixture of 4 parts of 3β-chloroacetoxy-17β-chloroacetylaminoandrost-5-ene, 60 parts of morpholine, and 88 parts of benzene is maintained in a sealed vessel at 65° for 24 hours. Volatile components are thereupon removed by vacuum distillation, and the residue is triturated with a 3:1 mixture of hexane and ether. The resultant mixture is filtered, and the solid product thus isolated is triturated with water. The resultant mixture is filtered, and the solids so separated dried in air. The material thus obtained is 3β-morpholinoacetoxy-17β- morpholinoacetylaminoandrost-5-ene, which melts at 188–191° and has the formula

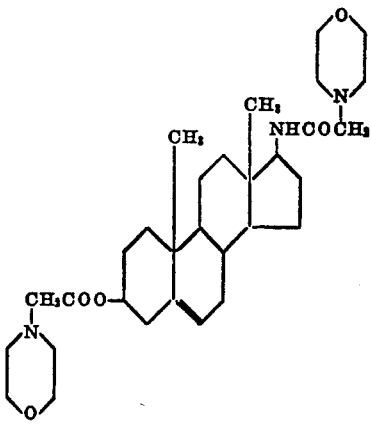

EXAMPLE 9

*17β-morpholinoacetylaminoandrost-5-en-3β-ol*

Substitution of 2 parts of 3β-morpholinoacetoxy-17β-morpholinoacetylaminoandrost-5-ene for the 3β-diethylaminoacetoxy - 17β - diethylaminoacetylaminoandrost-5-ene called for in Example 2 affords, by the procedure there detailed, 17β-morpholinoacetylaminoandrost-5-en-3β-ol, melting at 211–214° and having the formula

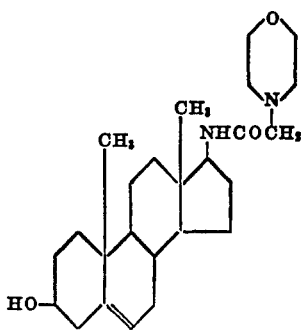

EXAMPLE 10

*17β-morpholinoacetylaminoandrost-4-en-3-one*

Substitution of 8 parts of 17β-morpholinoacetylaminoandrost-5-en-3β-ol for the 17β-diethylaminoacetylaminoandrost-5-en-3β-ol called for in Example 3A affords, by the procedure there detailed, 17β-morpholinoacetylaminoandrost-4-en-3-one, which melts at 143–146°. The product has the formula

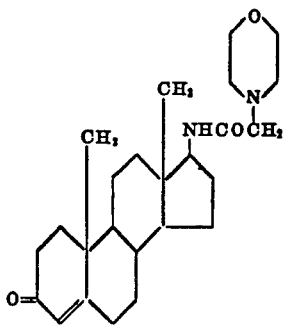

EXAMPLE 11

(A) *3β - (3 - methyl - 2 phenylmorpholinoacetoxy)-17β-(3 - methyl - 2 - phenylmorpholinoacetylamino)androst 5-ene*

A mixture of 2 parts of 3β-chloroacetoxy-17β-chloroacetylaminoandrost-5-ene and 4 parts of 3-methyl-2-phenylmorpholine is heated at 90–95° for 1 hour and then transferred to a sealed vessel at 65° for 24 hours. After cooling, the resultant solid mixture is extracted by trituration with ether and subsequently filtered. The filtrate is stripped of solvent by evaporation in a nitrogen atmosphere, and the residue is triturated with hexane to produce a finely-divided solid. The material thus obtained is 3β-(3-methyl-2-phenylmorpholinoacetoxy)-17β-(3 - methyl - 2 - phenylmorpholinoacetylamino)androst-5-ene, isolable by filtration and having the formula

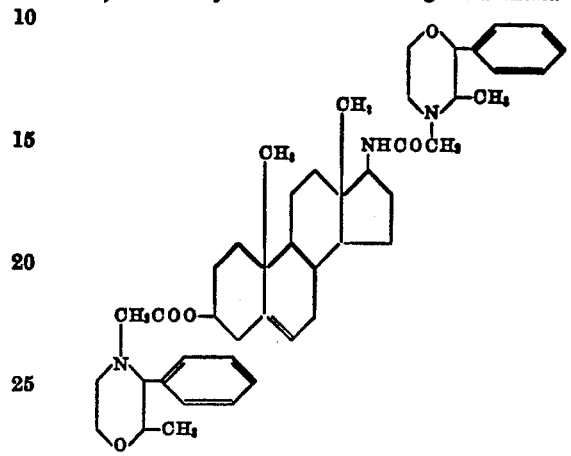

(B) *3β - (3-methyl - 2 - phenylmorpholinoacetoxy) - 17β-(3 - methyl - 2 - phenylmorholinoacetylamino)androst-5 - ene dihydrochloride*

From a methanol solution of 3β-(3-methyl-2-phenylmorpholinoacetoxy) - 17β - (3 - methyl - 2 - phenylmorpholinoacetylamino)androst - 5 - ene, upon acidification with hydrogen chloride dissolved in 2-propanol and subsequent dilution with ether, there is precipitated 3β-(3-methyl - 2 - phenylmorpholinoacetoxy) - 17β - (3-methyl - 2 - phenylmorpholinoacetylamino)androst - 5-ene dihydrochloride, which is recovered by filtration.

EXAMPLE 12

(A) *17β-(3-methyl-2-phenylmorpholinoacetylamino)-androst-5-en-3β-ol*

A mixture of 5 parts of 3β-chloroacetoxy-17β-chloroacetylaminoandrost-5-ene, 10 parts of 2-phenyl-3-methylmorpholine, 5 parts of finely-divided potassium carbonate, 76 parts of ethanol, and 5 parts of water is heated at the boiling point under reflux for 6 hours, following which it is poured into water. The resultant mixture is cooled to 5°, and the supernatant water is decanted from the oil which settles out. This oil is 17β-(3-methyl - 2 - phenylmorpholinoacetylamino)androst - 5-en-3β-ol, of the formula

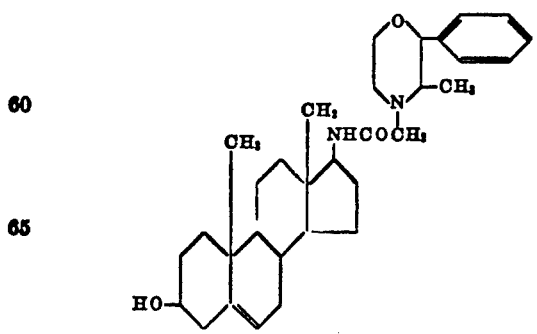

(B) *17β-(3-methyl-2-phenylmorpholinoacetylamino)-androst-5-en-3β-ol hydrochloride*

The free base of the foregoing Part A of this example is taken up in 25 parts of warm methanol, and the resultant solution is acidified by slowly incorporating concentrated hydrochloric acid therein. As soon as acidification is achieved, addition of hydrochloric acid is stopped and approximately 100 parts of warm water is slowly introduced. A crystalline solid is thrown down, which is recovered on a filter and recrystallized from a mixture of methanol and water. The material thus obtained is 17β - (3 - methyl - 2 - phenylmorpholinoacetylamino)-androst-5-en-3β-ol hydrochloride. The melting point of this material is not definitive.

EXAMPLE 13

(A) *17β-(3-methyl-2-phenylmorpholinoacetylamino)-androst-4-en-3-one*

To a solution of 2 parts of 17β-(3-methyl-2-phenylmorpholinoacetylamino)androst-5-en-3β-ol and 15 parts of cyclohexanone in 175 parts of toluene at the boiling point under reflux is slowly added a solution of 2 parts of aluminum isopropoxide in 45 parts of toluene. Approximately 70 parts of toluene is thereupon slowly distilled off, following which heating at the boiling point under reflux is resumed for an additional 30 minutes. The resultant mixture is partitioned between ethyl acetate and saturated aqueous Rochelle salt. The aqueous phase is discarded; and the ethyl acetate solution which remains is dried over anhydrous sodium sulfate and stripped of solvent by vacuum distillation. The residue is taken up in hexane, and the resultant solution is filtered through diatomaceous earth. Solvent is stripped from the filtrate by vacuum distillation. The residue is 17β-(3-methyl-2-phenylmorpholinoacetylamino)androst-4-en-3-one, of the formula

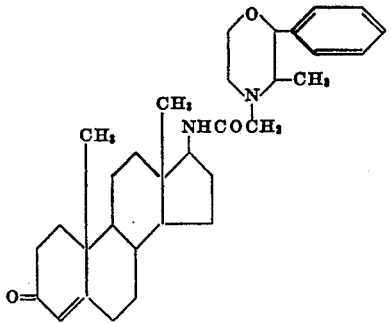

(B) *17β-(3-methyl-2-phenylmorpholinoacetylamino)-androst-4-en-3-one hydrochloride*

A methanol solution of 17β-(3-methyl-2-phenylmorpholinoacetylamino)androst-4-en - 3 - one, made barely acid with 2-propanolic hydrogen chloride and then diluted with ether to the point of incipient turbidity, affords, a brown semicrystalline oil which granulates on standing in the cold. Crystallization of the granular product from a mixture of methanol and acetone affords 17β - (3 - methyl - 2 - phenylmorpholinoacetylamino)-androst-4-en-3-one hydrochloride lacking a definitive melting point.

What is claimed is:
1. A compound selected from the group consisting of Δ⁴ and Δ⁵ androstenes of the formula

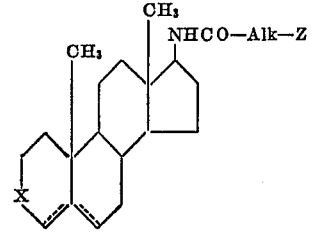

and 5α-androstanes identical therewith except for the indicated hydrogen, Alk in the formula being a lower alkylene radical; Z in the formula being selected from the group consisting of di(lower alkyl)amino, morpholino, and 3-methyl-2-phenylmorpholino radicals; X in the formula being selected from the group consisting of carbonyl, β-hydroxymethylene, and β-(lower alkanoyloxy)-methylene radicals and radicals of the formula

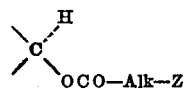

wherein Alk and Z have the meanings previously assigned; and the dotted line in the compound formula representing a double bond in the 4-position when X is a carbonyl radical and in the 5-position otherwise.

2. 17β-diethylaminoacetylaminoandrost-5-en-3β-ol.
3. 17β-diethylaminoacetylaminoandrost-4-en-3-one.
4. 17β-diethylaminoacetylamino-5α-androstan-3-one.
5. 3β - morpholinoacetoxy - 17β - morpholinoacetylaminoandrost-5-ene.
6. 17β-(3-methyl - 2 - phenylmorpholinoacetylamino)-androst-4-en-3-one.
7. 3β - chloroacetoxy - 17β - chloroacetylaminoandrost-5-ene.
8. 3β-acetoxy-17β-chloroacetylamino-5α-androstane.

No references cited.

UNITED STATES PATENT OFFICE

CERTIFICATE OF CORRECTION

Patent No. 3,001,988 September 26, 1961

Leonard N. Nysted

It is hereby certified that error appears in the above numbered patent requiring correction and that the said Letters Patent should read as corrected below.

Column 1, line 49, for "lower" read -- lower --; column 5, line 60, for "-5-one" read -- -5-ene --.

Signed and sealed this 1st day of May 1962.

(SEAL)
Attest:

ERNEST W. SWIDER
Attesting Officer

DAVID L. LADD
Commissioner of Patents